Aug. 19, 1952     H. H. TALBOYS     2,607,251
POWER TRANSMISSION FOR TRACKWORKING TOOLS AND THE LIKE
Original Filed May 4, 1944     6 Sheets-Sheet 1
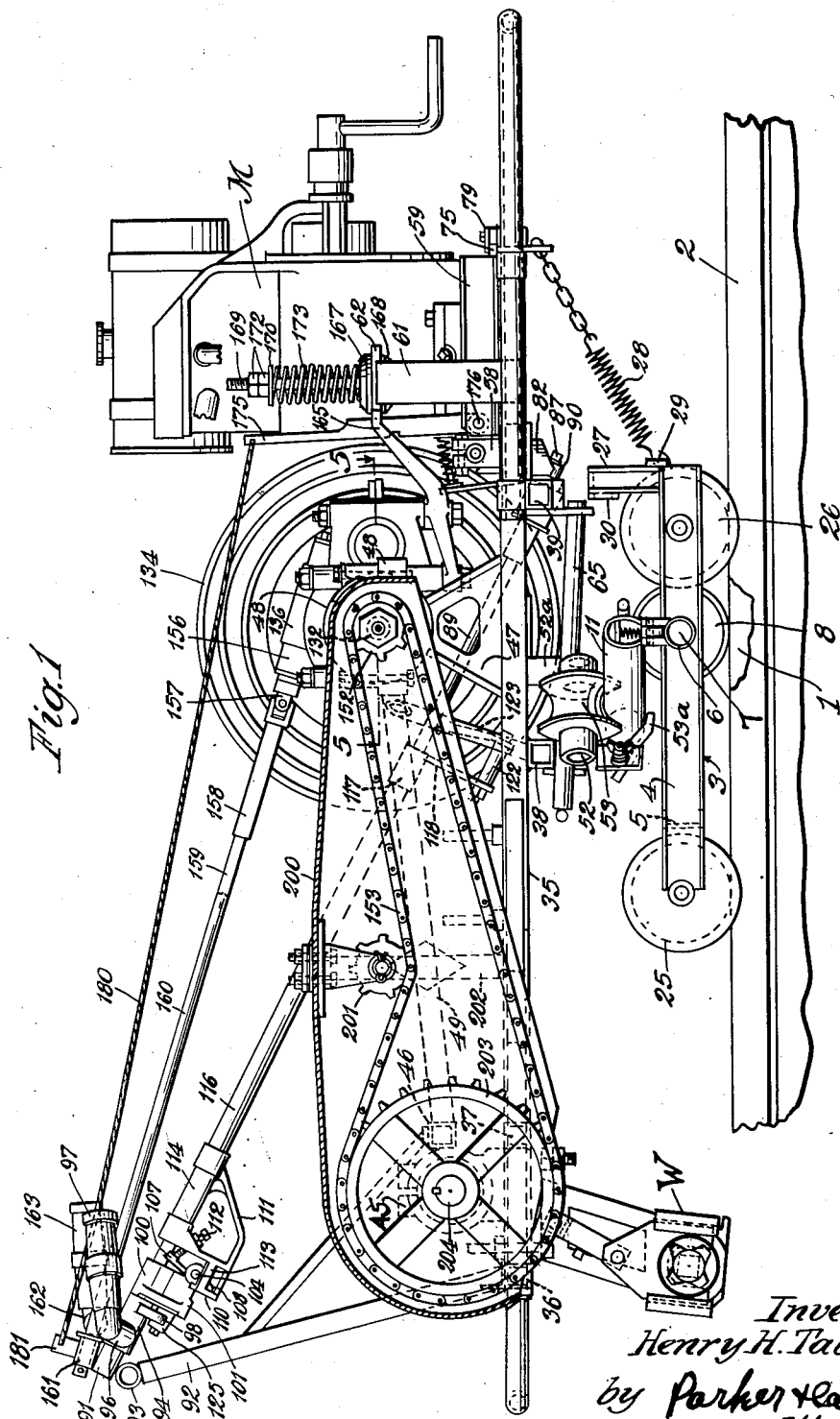
Inventor
Henry H. Talboys
by Parker & Carter
Attorneys

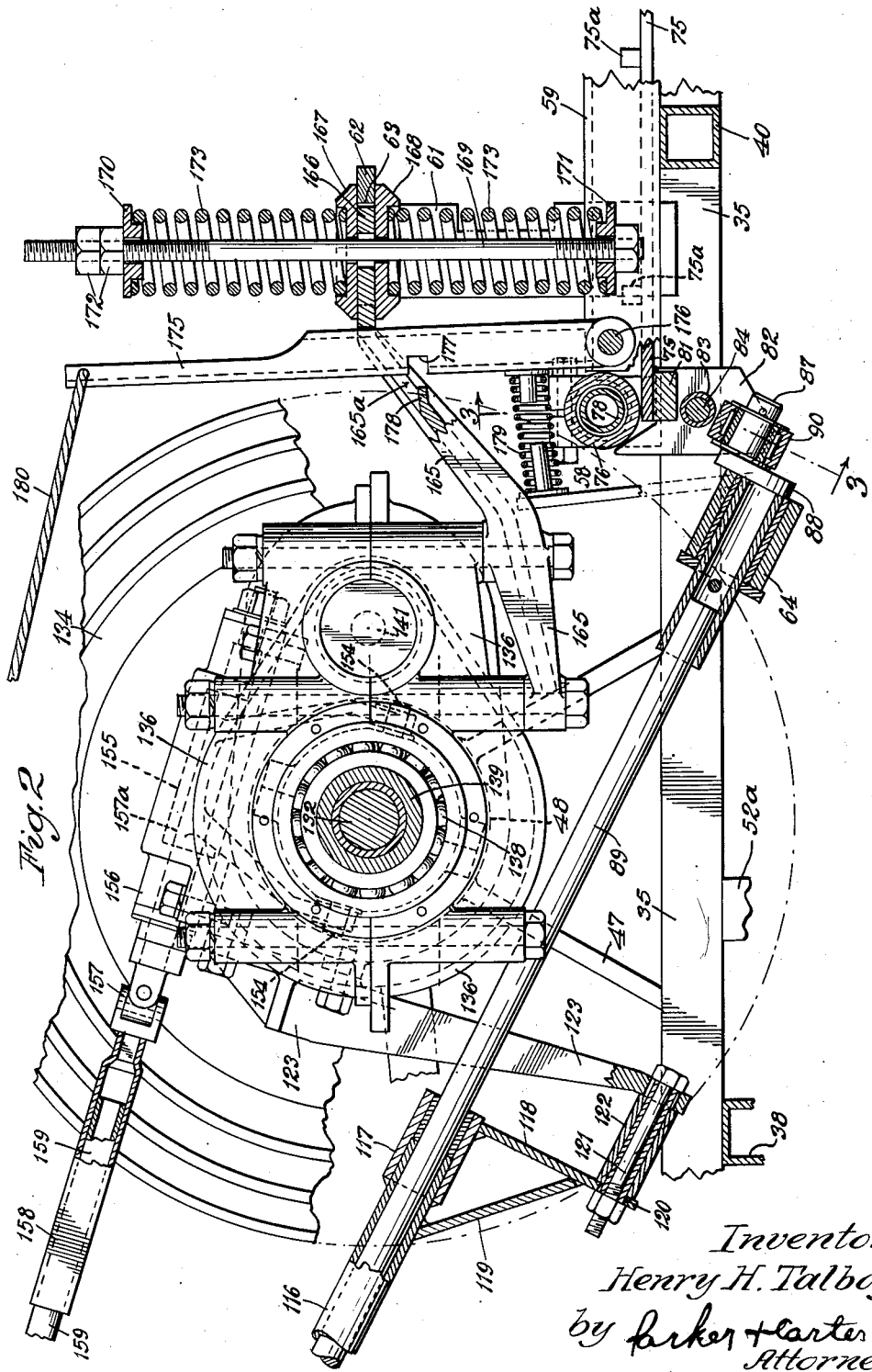

Aug. 19, 1952     H. H. TALBOYS     2,607,251
POWER TRANSMISSION FOR TRACKWORKING TOOLS AND THE LIKE
Original Filed May 4, 1944     6 Sheets-Sheet 3
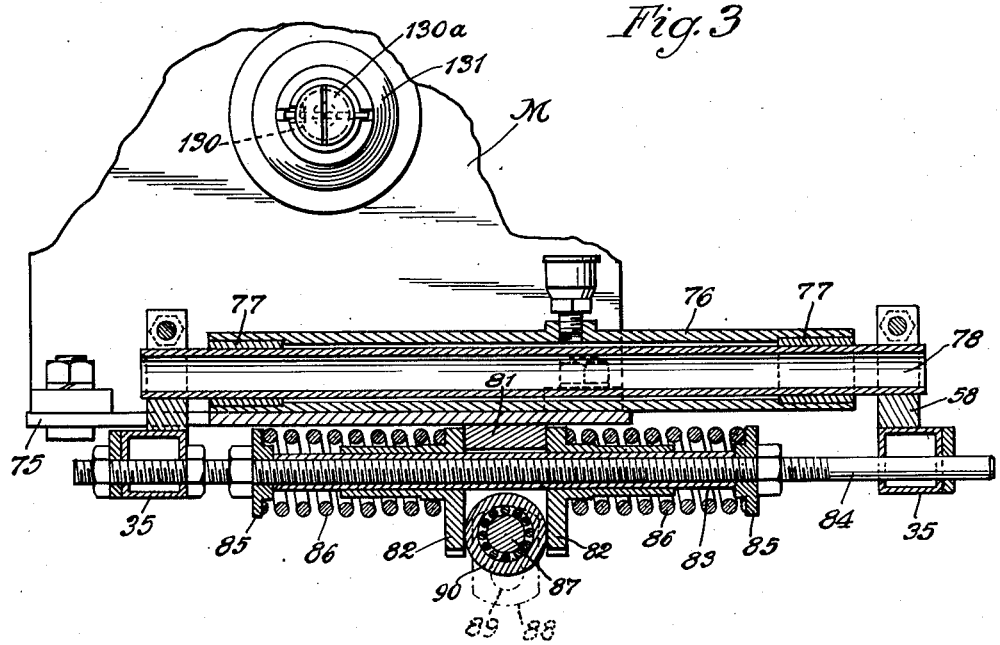
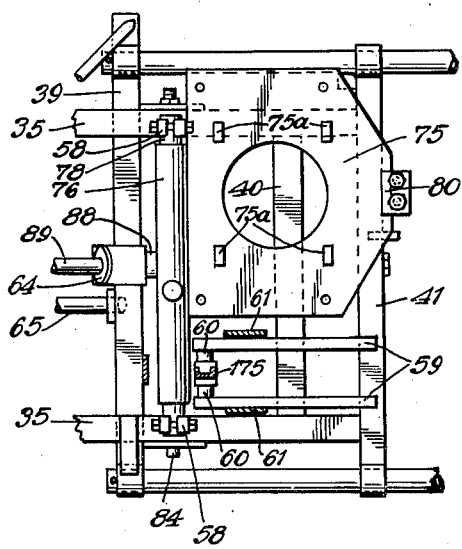
Inventor
Henry H. Talboys
by Parker & Carter
Attorneys

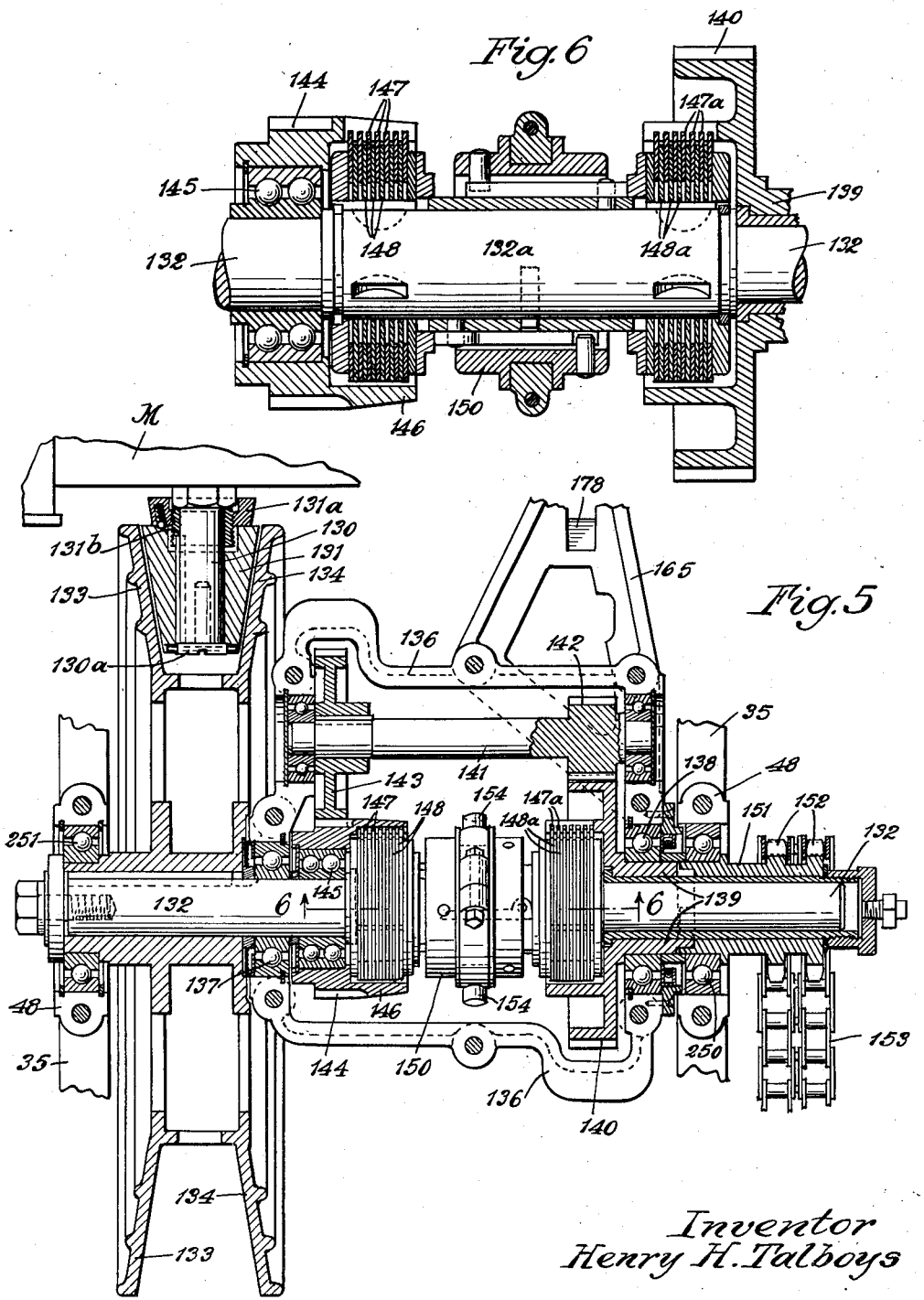

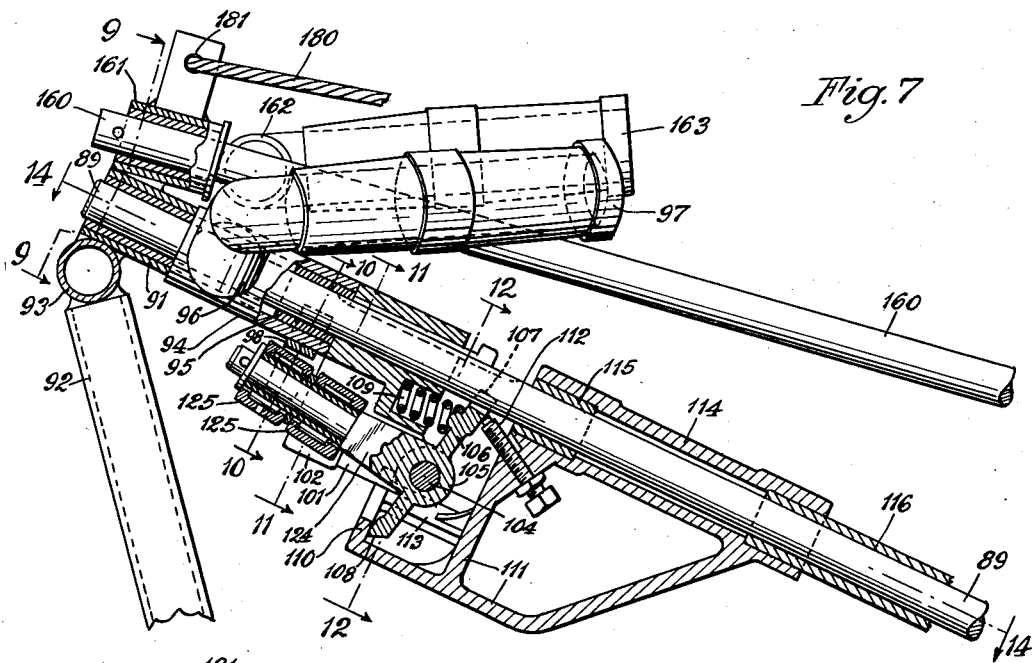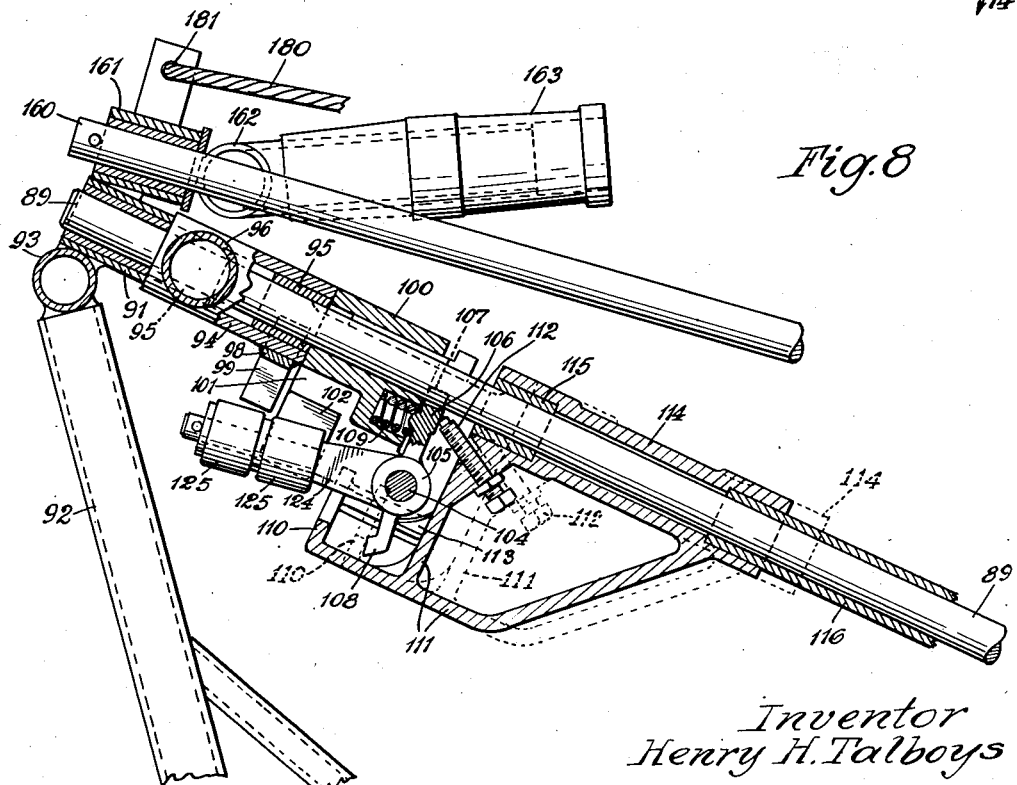

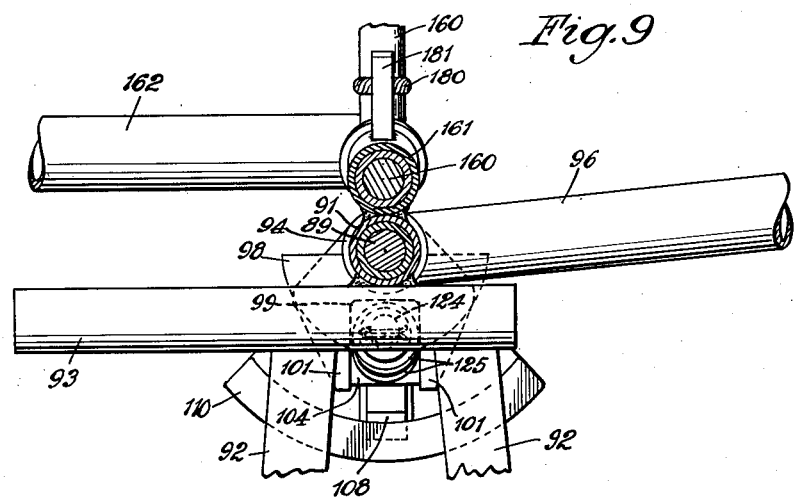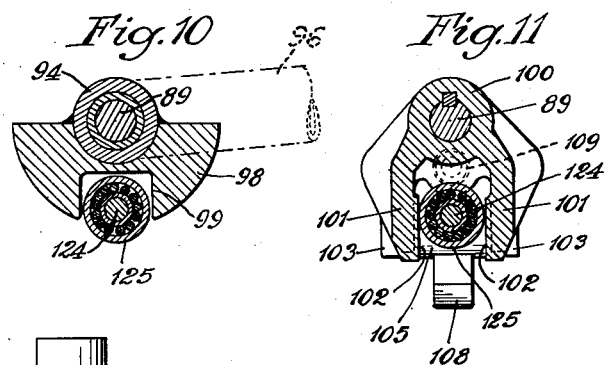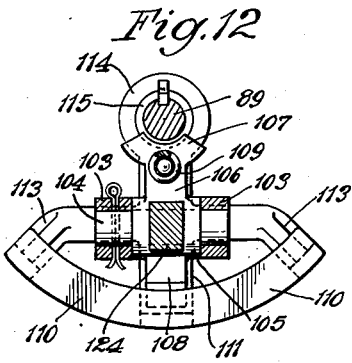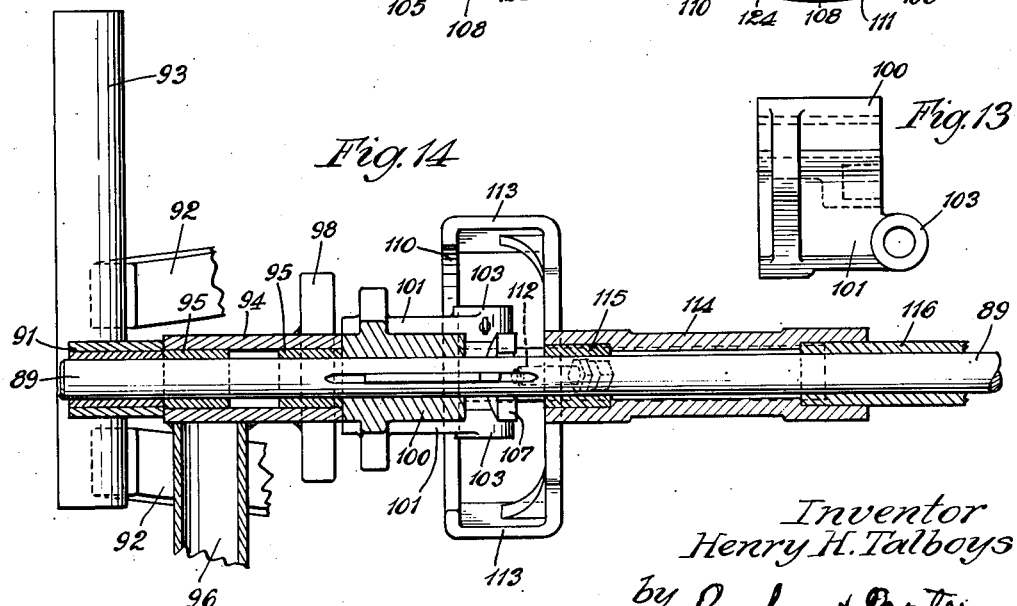

Patented Aug. 19, 1952

2,607,251

UNITED STATES PATENT OFFICE 2,607,251

POWER TRANSMISSION FOR TRACKWORKING TOOLS AND THE LIKE

Henry H. Talboys, Milwaukee, Wis., assignor to Nordberg Manufacturing Company, Milwaukee, Wis., a corporation of Wisconsin Original application May 4, 1944, Serial No. 534,081. Divided and this application November 13, 1950, Serial No. 195,370

8 Claims. (Cl. 81—54)

My invention relates to an improvement in driving actuating assemblies used for example with trackworking equipment, such as track wrenches and the like, and has for one purpose to provide a driving and actuating assembly, including an improved frictional drive.

Another purpose is to provide such an assembly in which a motor is movably supported and may be selectively connected with one or another of two driven members, for example by bodily movement of the motor.

Another purpose is to provide an improved actuating or control means for such an assembly.

Another purpose is to provide improved reversing means.

Another purpose is to provide a reversible control unit.

Other purposes will appear from time to time in the course of the specification and claims.

The present application is a division of my copending application Serial Number 534,081, for Machine Operated Track Wrench, filed in the United States Patent Office May 4, 1944, and now Patent No. 2,552,655, issued on May 15, 1951.

The invention is illustrated more or less diagrammatically in the accompanying drawings, wherein:

Figure 1 is a side elevation of a structure, in this instance a track wrench, in which my invention is included;

Figure 2 is a partial vertical longitudinal section on an enlarged scale;

Figure 3 is an enlarged section on the line 3—3 of Figure 2;

Figure 4 is a partial plan view of the frame illustrating the motor support;

Figure 5 is an enlarged section on the line 5—5 of Figure 1;

Figure 6 is an enlarged section on the line 6—6 of Figure 5;

Figure 7 is a partial section illustrating the control handles and associated parts;

Figure 8 is a similar view with the parts in a different position;

Figure 9 is a section on the line 9—9 of Figure 7;

Figure 10 is a section on the line 10—10 of Figure 7;

Figure 11 is a section on the line 11—11 of Figure 7;

Figure 12 is a section on the line 12—12 of Figure 7;

Figure 13 is a detail view; and

Figure 14 is a section on the line 14—14 of Figure 7.

Like parts are indicated by like symbols throughout the specification and drawings.

Referring to the drawings and, for example, to Figure 1, 1, 2 illustrate two rails of a track upon which operates the device shown in the drawings. While the details of the mechanism actuated do not of themselves form part of the present invention, Figure 1 illustrates a so-called track wrench W which may be employed to tighten or loosen transversely horizontally axised nuts and bolts employed along rails, switches and the like. The illustrated structure includes a base frame generally indicated at 3, having a pair of parallel side frame elements 4 suitably connected by cross pieces 5 and secured to a transversely extending track spanning member 6. The member 6 may be telescopically formed and may terminate in an end roller 8 adapted to engage the rail 1, whereas the base frame 3 is supported on the rail 2 for example by flanged wheels or rollers 25, 26.

Mounted on the base frame and extending across and above the rails is the arcuate supporting track 11 the ends of which are secured in relation to the ends of the member 6.

Upwardly extending from one end of the side frame members 3 and 4 is a bridge structure generally indicated at 27. An upper frame may be connected to the bridge 27 by one or more springs 28 anchored on the cross piece 29. The bridge also includes a cross piece 30, which may be apertured to receive a plunger 65 mounted on the below-described upper frame.

Mounted on the base frame is a sub-frame or operating frame, which carries the wrench structure proper and the lower power plant therefor. The upper frame includes longitudinally extending side frame elements 35, 35, with a plurality of cross pieces 36, 37, 38, 39, 40 and 41. 46 is a cross piece vertically aligned with and upwardly spaced from the cross piece 37. Mounted on an intermediate portion of the side frames 35 are bearing supporting brackets 47, which support bearing clamps 48. The bearing clamps 48 are connected to the cross piece 46 by the longitudinally extending upper members 49. Mounted below the frame members 35 on any suitable brackets 52a are shafts 52, about which wheels 53 are rotatably mounted, the wheels being shaped to engage the arcuate track 11. 53a is any suitable retainer for preventing unintended upward movement of the upper carriage from the rail 11. Any suitable means may be employed for permitting movement of the member 53a to the releasing position, when the operator wishes to lift the upper carriage or frame from the lower.

58 are bearings upwardly extending from the side frame members 35, the purpose of which will later appear. 59, 59, as shown in Figure 4, are two channels, each carrying a bearing 60. 61 are upwardly extending brackets carrying at their upper end retaining members 62, cut away as at 63 for a purpose which will later appear.

Mounted on the cross piece 39 is a bearing block 64. 65 is a locking plunger.

With reference to Figure 1, it will be observed that any suitable power plant, for example an internal combustion motor M, may be mounted on the above-described frame and serves to provide power for the wrench mechanism. The motor M rests upon any suitable supporting plate 75, secured to a sleeve 76 which carries within it bearing elements 77, slidable on the shaft 78 held in the above-described members 58. It will be observed that the motor may be adjusted along the shaft 78. The plate 75, at its opposite edge, is confined by an overhanging plate 80, which is attached to a bracket 79 on the member 41. Thus rotation of the plate 75 about the axis of the shaft 78 is prevented. Secured to the bottom of the plate 75 is a block 81, seen best in Figure 3. Abutting against its opposite edges are opposed thrust elements 82, slidable on the spacer sleeve 83, adjustably mounted on the shaft 84, which extends between the side frame elements 35. 85 are abutments mounted on the shaft 84 at the opposite ends of the sleeve 83. Between each of the abutments 85 and one of the thrust members 82 is compressed a spring 86. Thus, the plate 75 is normally centered at a predetermined position on the shaft 78. It may be moved from this position by the crank pin 87, which extends from the crank arm 88 on the shaft 89, mounted in the bearing 64. 90 is any suitable anti-frictional member surrounding the pin 87 and interposed between the abutments 82. The outer upper end of the shaft 89 is supported in a bearing sleeve 91 which, in turn, is supported on the handle structure 92, with its short upper handle bar 93. Member 92 is secured at its lower end to the main frame. As shown in Figures 7 and 8, 94 illustrates a sleeve surrounding the shaft 89 and provided with inner bearing members 95. Secured to the sleeve 94 is an outwardly extending bar 96 with any suitable handle grip 97. Secured to the sleeve 94 is a half round portion 98, with a cutaway portion 99. 100 is a second sleeve, which is keyed to the shaft 89 and which abuts at its outer end against the end of the sleeve 94, which is free on the shaft 89.

Extending downwardly from the member 100 are generally parallel wings 101, having opposed inner parallel faces 102. Each of the wings is provided with a bearing element 103 for the pin 104, surrounded by the sleeve 105, having an upper projection 106, having a forked upper end 107, conforming generally to the underside of the shaft 89. 108 is a downward extension from the sleeve 105, normally thrust by the spring 109 into the position in which it is shown in Figure 7, in which it abuts a limit flange 110 of the member 111. The upper projection 106 abuts the adjustable pin 112 of the member 111. The flange 110 is generally arcuate, as shown in Figure 12, and is connected by arms 113 with the sleeve 114, which surrounds the shaft 89 and is provided with a bearing sleeve 115 and an extension sleeve 116. The extension sleeve 116 has a bearing 117, Figure 2, at its opposite, lower end. The bearing 117 has a downwardly projecting arm 118, with its reinforcement 119, and is apertured at 120 to receive a connecting pin 121 of a diameter somewhat less than the aperture 120 to provide a measure of flexibility. Connected to the opposite end of the member 121, and spaced by the spacing sleeve 122, is the arm 123, which is connected to a clutch housing, which will later be described.

Also mounted on the sleeve 105 is the arm 124, which carries two anti-friction members 125, one of which may seat within the cutaway portion 99 of the member 98; the other being adapted to seat between the opposed parallel faces 102 of the arms 101. It will be understood that when the parts are in the position in which they are shown in Figure 7, if the handle 97 is rotated in either direction, the result is to rotate the sleeve 94 which, in turn, rotates the arm 124 and, through it, the sleeve 100, which is keyed to the shaft 89. This rotates the shaft 89 and actuates the crank 87 and bodily moves the motor supporting platform. In other words, the operator, through the handle 97, can move the motor platform transversely in either direction from a predetermined neutral position in which it is yieldingly held by the springs 86.

The motor M may be of any suitable type, the details of which are not shown since they do not of themselves form part of the present invention. Referring, for example, to Figure 5, the motor is shown as provided with an outwardly extending drive shaft or stub 130, upon which is adjustably mounted a driving member 131 in the form of a truncated cone of fibre, or other suitable material. When the motor platform is permitted to take the neutral position into which it is normally urged by the springs 86, the cone 131 will be in the neutral or inactive position in which it is shown in Figure 5.

With reference to the structure of Figure 5, the frictional exterior surface of the conic or bevel gear 131 is subject to wear and thus to reduction in diameter. To compensate for such wear, it is necessary to move the member 131 toward the below-described shaft 132. This is accomplished by advancing the nut 131a on the threaded element 131b, after first loosening the machine screw 130a. In order to get at the machine screw 130a, it is necessary to remove the motor. To relocate the motor after its removal from the plate 75, the aligning or locating lugs 75a have been added to assist in rapid realignment.

132 is any suitable driven shaft upon which is fixed a pulley element having outwardly flared members 133, 134 having faces adapted to be opposed to the member 131. When the motor M is moved in one direction, the cone 131 engages the member 133. When the motor is moved in the opposite direction, the cone 131 engages the opposite member 134. Thus, in response to rotation of the control shaft 89 by the above-described structure, the operator, by manipulating the handle 97, may cause the motor to drive the shaft 132 in the rotational direction desired. When the handle 97 is released, the motor platform moves to the neutral position and the cone 131 is thereby returned to the inactive position in which it is shown in Figure 5. The shaft 132 is supported in any suitable bearings which are mounted in the bearing clamps 48, as shown, for example, in Figure 5.

A two-speed transmission is indicated, although it will be understood that any suitable multiple speed transmission may be employed. However, the structure shown includes a split housing 136, supported by an anti-friction member 138 on a sleeve 139, which is, in effect, the hub of the gear 140.

Rotatably mounted on the housing itself is a shaft 141 having a pinion 142 in mesh with the gear 140, and a gear 143 in mesh with an opposed gear 144 which, in turn, is rotatable about the shaft 132. Any suitable anti-friction means 145 is employed. The gear 144 carries an outwardly extending shell 146, in which are carried clutch plates 147, which interpenetrate with opposed clutch plates 148 held against rotation in relation to the intermediate enlarged portion 132a of the shaft 132. A similar system of plates is shown at 147a, 148a, in connection with the gear 140. A clutch actuating sleeve 150 is slidable along the shaft portion 132a and is effective, when moved to its opposite limit of movement, to lock the gear 140 in relation to the shaft 132. Thus, depending upon the actuation of the clutch actuating sleeve 150, the sleeve 139 is rotated either directly by the shaft 132 or indirectly, through the sub-shaft 141, at reduced speed. This constitutes a simple and efficient two-speed mechanism.

A sleeve 151 surrounds the right-hand end of the shaft 132, referring to the parts in the position in which they are shown in Figure 5. This sleeve may be driven in any suitable manner from the sleeve 139 of the gear 140. For example, an interpenetration of the sleeves 139 and 151, as shown in Figure 5, may be employed. The sleeve 151 carries the twin driving sprockets 152, about which pass any suitable chains 153.

In order to actuate the clutch sleeve 150, there are provided outwardly extending pins 154, which are engaged by a fork 155, which is supported by any suitable bearings in a housing 156, attached to the gear box 136. 157 illustrates any suitable universal joint connected to the fork 155 by a shaft 157a. It is also connected to a squared socket or sleeve 158, which is penetrated by a squared member 159 at the end of the actuating rod 160. The shaft or rod 160 is supported in an upper bearing 161, secured adjacent to the bearing 91 of the rod or shaft 89, as shown in Figures 7 and 8. Secured to the shaft 160 is the operating arm 162 with the handle 163 thereupon.

The gear box 136, which is otherwise free to rotate around the shaft 132, is held to a limited rotation by the arm 165 secured thereto. The outer end of the arm 165 is provided with a portion 166, which lies within the aperture 63 of the member 62.

Engaging the top and bottom of the plate 62 and the top and bottom of the member 166, are spring abutments 167, 168. A pin 169 passes through aligned apertures in the members 166, 167, and 168, and carries at each end spring seats 170 and 171. Any suitable adjusting nuts 172 may be provided to adjust the compression of the springs 173, of which one is compressed between the members 167 and 170, and the other is compressed between the members 168 and 171. These springs tend to hold the arm 165 in the position in which it is shown in Figure 2. The result is to provide means for normally preventing rotation of the gear box 136, while permitting an overload release. Note also that the arm 165 may be positively locked in the position in which it is shown in Figure 2 by means of the locking lever 175, pivoted as at 176 in the bearings 60. It passes upwardly through an aperture 165a in the arm 165 and is provided with a locking notch 177 opposed to a locking edge 178 of said aperture. A spring 179 tends normally to urge the lever 175 to the release position in which it is shown in Figure 2. A cord or chain 180 may be employed to move it toward the locking position, the opposite end of the cord or chain 180 being anchored, as at 181, adjacent the operating handles, above described, this anchored cord being shown in Figures 7 and 8.

When the drive mechanism encounters an overload, rotation of the gear box 136 against the action of spring 173 will shift sleeve 116 longitudinally of shaft 89 and disengage the roller 125 from sleeve 94, thus rendering control handle 95 ineffective to hold the motor M in engaged position.

The chains 153 drive the wrench structure proper. Referring, for example, to Figure 1, the chains 153 are shown in a safety housing structure 200. An idler sprocket 201 is adjustably mounted on a vertical bracket 202. 203 is a driven sprocket about which pass the chains 153, the sprocket being keyed to a shaft 204 mounted in the bearing clamps 45.

It will be realized that whereas a practical and operative structure has been described and shown, nevertheless many changes in size, shape, number and disposition of parts may be made without departing materially from the spirit of the invention. I therefore wish my description and drawings to be taken as in a broad sense illustrative or diagrammatic, rather than as limiting me to my specific showing herein. In particular, it will be understood that whereas my invention is shown in connection with a reversibly actuatable track wrench, my control means may be applied to a wide variety of different structures.

The use and operation of the device are as follows:

Referring for example to Figure 1, there is illustrated a structure in which a base frame or lower carriage directly engages both rails of a track. This bottom carriage is shown in plan view, for example, in Figure 3. The major weight of the device is aligned with the track portion which carries the rail engaging wheels 25 and 26. The device may be reversed on the track by removing the member 7 from one end of the cross piece 6 and reinserting it in the other end.

In operating the device, it will be understood that the motor is normally in constant rotation. With reference to the showing of Figure 5, when the motor M is in intermediate or neutral position, the conic driving member 131 engages neither of the driven members. However, when the motor M is moved to the right, referring to the position of the parts in Figure 5, it engages and drives the pulley element 134. When the motor is moved to the left, the driving cone 131 engages and drives the pulley 133. Where, as in the present structure, one pulley drives a driven member in one direction and one in the other, the movement of the motor may be employed simply as a means for driving the chain structure in reverse directions.

It will also be understood that my invention is applicable to any disposition of parts where, when the motor is moved to one limit of its movement, one act is performed and, when it is moved to the opposite limit of its movement, a different act is performed. Thus my invention lends itself to alternate and selective operation of different drives for a wide variety of purposes.

I claim:

1. A driving and actuating assembly including a carriage having a working member mounted thereon, a motor movably supported on said carriage, a frictional drive member adapted to be rotated by said motor, a plurality of frictional driven members rotatably mounted on said carriage, driving connections between each said driven member and said working member, means for normally maintaining said motor with said drive member in neutral position and out of contact with either of said driven members, manual control means for bodily and unitarily moving said motor and said drive member, whereby to engage said drive member selectively with one or the other of said driven members.

2. A driving and actuating assembly including a carriage having a working member mounted thereon, a motor movably supported on said carriage, a frictional drive member adapted to be rotated by said motor, a plurality of frictional driven members rotatably mounted on said carriage, driving connections between each said driven member and said working member, means for normally maintaining said motor with said drive member in neutral position and out of contact with either of said driven members, manual control means for bodily and unitarily moving said motor and said drive member, whereby to engage said drive member selectively with one or the other of said driven members, including a manually rotatable control shaft and an eccentric connection between said control shaft and said motor.

3. A driving and actuating assembly including a carriage having a working member mounted thereon, a motor movably supported on said carriage, a frictional drive member adapted to be rotated by said motor, a plurality of frictional driven members rotatably mounted on said carriage, driving connections between each said driven member and said working member, means for normally maintaining said motor with said drive member in neutral position and out of contact with either of said driven members, manual control means for bodily and unitarily moving said motor and said drive member, whereby to engage said drive member selectively with one of the other of said driven members, and release means adapted to return said motor and drive member to neutral position in response to overload.

4. A driving and actuating assembly including a carriage, having a working member mounted thereon, a motor movably supported on said carriage, a frictional drive member adapted to be rotated by said motor, a plurality of frictional driven members rotatably mounted on said carriage, driving connections between each said driven member and said working member, means for normally maintaining said motor with said drive member in neutral position and out of contact with either of said driven members, manual control means for bodily and unitarily moving said motor and said drive member, whereby to engage said drive member selectively with one or the other of said driven members and release means adapted to return said motor and drive member to neutral position in response to overload, and means for locking out said release means.

5. A driving and actuating assembly including a carriage, having a working member mounted thereon, a motor movably supported on said carriage, a frictional drive member adapted to be rotated by said motor, a plurality of frictional driven members rotatably mounted on said carriage, driving connections between each said driven member and said working member, yield-able means for normally maintaining said motor with said drive member in neutral position and out of contact with either of said driven members, manual control means for bodily and unitarily moving said motor and said drive member, whereby to engage said drive member selectively with one or the other of said driven members, and overload responsive means for rendering said manual control means ineffective.

6. A driving and actuating assembly including a carriage, a motor on said carriage, and driving means on said carriage, said driving means including a driven shaft having a pair of oppositely tapered generally conic driven friction gears, a frictional driving gear in driven relationship with said motor, normally positioned between said driven friction gears and out of contact therewith, a gear shift mechanism, a control lever therefor, and means for moving said frictional gears into operative connection, including a second control lever, said control levers having adjacent actuating ends.

7. A driving and actuating assembly including a carriage, a motor on said carriage, and driving means on said carriage, said driving means including a driven shaft having a pair of oppositely tapered generally conic driven friction gears, a frictional driving gear in driven relationship with said motor, normally positioned between said driven friction gears and out of contact therewith, a gear shift mechanism, a control lever therefor, and means for moving said frictional gears into operative connection, including a second control lever, said control levers having adjacent actuating ends, and means for breaking the connection between said frictional gears, effective whenever said second control lever is released by the operator.

8. A driving and actuating assembly for use with trackworking equipment, including a base, driven members on said base, a carriage movable on said base, a motor on said carriage, driving means on said carriage, said driving means including a driven shaft having a pair of oppositely tapered generally conic driven friction gears, a frictional driving gear and a driving connection between it and said motor, said driving gear being normally positioned between said driven friction gears and out of contact therewith, a gear shift mechanism, a control lever therefor, and means for moving said frictional gears into operative connection, including a second control lever, said control levers having adjacent actuating ends, and means for breaking the connection between said frictional gears, effective whenever said second control lever is released by the operator.

HENRY H. TALBOYS.

REFERENCES CITED

The following references are of record in the file of this patent:

UNITED STATES PATENTS

| Number | Name | Date |
|---|---|---|
| 1,592,262 | Everett | July 13, 1926 |
| 1,807,367 | Woolery | May 26, 1931 |
| 1,978,513 | Talboys | Mar. 20, 1933 |
| 2,073,967 | Kiefer | Mar. 16, 1937 |
| 2,228,589 | Bakes | Jan. 14, 1941 |
| 2,281,263 | Broander | Apr. 28, 1942 |

FOREIGN PATENTS

| Number | Country | Date |
|---|---|---|
| 408,464 | Great Britain | Apr. 12, 1934 |
| 799,676 | France | Apr. 11, 1936 |